United States Patent [19]

Case et al.

[11] 4,172,552
[45] Oct. 30, 1979

[54] CREDIT CARD PROCESSING SYSTEM

[76] Inventors: John M. Case, 35 Lehigh Rd., Wellesley, Mass. 02181; Elmer J. Gorn, 34 Laudholm Rd., Newton, Mass. 02158

[21] Appl. No.: 944,412

[22] Filed: Sep. 21, 1978

[51] Int. Cl.² .................. G06K 15/02; G06K 1/04; G06K 1/14; G06K 1/20
[52] U.S. Cl. .................................. 235/380; 234/59; 235/379; 235/432; 235/434; 235/493
[58] Field of Search .............. 235/380, 379, 375, 419, 235/434, 432; 340/149 A

[56] References Cited

U.S. PATENT DOCUMENTS

| | | | |
|---|---|---|---|
| 3,852,571 | 12/1974 | Hall et al. | 235/380 |
| 3,878,364 | 4/1975 | Mack et al. | 235/380 |
| 3,996,450 | 12/1976 | Kerkoff | 235/380 |
| 4,013,894 | 3/1977 | Foote et al. | 235/380 |

*Primary Examiner*—Daryl W. Cook
*Attorney, Agent, or Firm*—Russell & Nields

[57] ABSTRACT

A credit card processing system involving the use of a machine for reading the data encoded in the magnetic stripe of such a card and for printing such data in MICR characters, at the point of sale, along the bottom of the merchant's bank sales slip copy of each transaction under the credit card. The machine also has means for selecting any one of four punches for making a punch out in said bank copy in any one of four predetermined optional ABA standards positions to designate the transaction as a credit or charge transaction and whether it is to be processed by EDP or EFT procedures. The system also includes all of the various instrumentalities necessary to process each transaction, guided by the punch out information, through the merchant's bank, the clearing house, and the issuer institution for final posting and billing.

5 Claims, 10 Drawing Figures

CREDIT CARD PROCESSING SYSTEM

BACKGROUND OF THE INVENTION

In transactions involving the sales of goods and services on a short term credit basis, credit cards have become a major factor. However, the systems which have evolved to complete the transfer of funds and the settlement of accounts have placed increasing procedural burdens on the various persons and institutions involved in the processing. Such persons and institutions include the merchant, his bank of deposit, the several types of clearing houses, and the bank or other financial institution which has issued the credit card. Such processing has involved an undue amount of personal, individual interpretation, recording, and transfer of the data which is necessary to complete each transaction involved. This had added a substantial element of cost to the system, involving an increased cost burden, imposed primarily on the merchant, which is passed on to the public in an increased cost of the goods and services involved.

The investment in the established credit card transaction system is so great, that any procedural attempt to reduce the processing costs must be sufficiently simple, flexible and versatile to be able to accommodate itself to such existing system with a minimum of disruption.

There is an increasing objective, in funds transfer systems, toward the type of completely automatic system known as Electronic Funds Transfer or "EFT" usually interconnecting banks of deposit with the settlement banks. However, many banks do not as yet have the capability of offering EFT services. Nevertheless, almost without exception, banks conduct their internal accounting procedures by electronic data processing known as "EDP". As will be seen the present invention is completely compatible with both EFT and EDP Systems.

Credit cards systems not only involve transactions in which customers are charged for goods and services and for sums obtained under checking encashments, but also for transactions on which the customer's accounts are credited with sums for the return of goods and the like. As will be seen, the present invention has the capability of handling both charges and credits in a simple and expeditious manner.

SUMMARY OF THE INVENTION

The invention comprises a system including a novel machine, adapted to be installed at the merchant's point of sale, which machine is designed to receive a standard type of credit card, modified to have encoded, on a magnetic stripe, the type of data normally used to identify the customer in the same way as he would be identified as a depositer in a bank. The machine incorporates a magnetic stripe reader which feeds the data of the stripe into a printer which prints such data in magnetic ink characters along the bottom of the bank copy of the usual sales slip used for credit cards, such characters conforming to the standard American Bankers Association (ABA) Magnetic Ink Character Recognition (MICR) program. The machine will also transfer to said sales slip, the embossed die characters usually appearing on the credit card as well as on the merchants die inserted into the machine. The machine also has a printer for printing a date code in MICR characters on said bank copy which completes the data whereby the individual transaction as well as the customer can be readily identified. The printer also is adapted to print the amount of the transaction in MICR characters on said bank copy.

In order to identify the transaction as one which is to be processed as a charge or a credit, in either case, by EFT or by EDP, the machine is provided with a mechanism whereby a punch-out made in one of a number of uniquely located positions along the bottom of said bank copy serves to identify which of the above four types of transactions are involved. The selection of the punch out is under the control of the merchant's clerk, but the machine is provided with means to minimize the chance of error in such selection.

The system of the invention also includes a simplified EDP processing channel for transactions identified by a punch-out identifying the EDP items. The system is also compatible with such processing channels for EFT transactions as described and claimed in the copending application Ser. No. 924,200, filed July 13, 1978 as well as with the system for processing travel cards as described and claimed in U.S. Pat. No. 4,017,101, Apr. 12, 1927.

Figure 1:
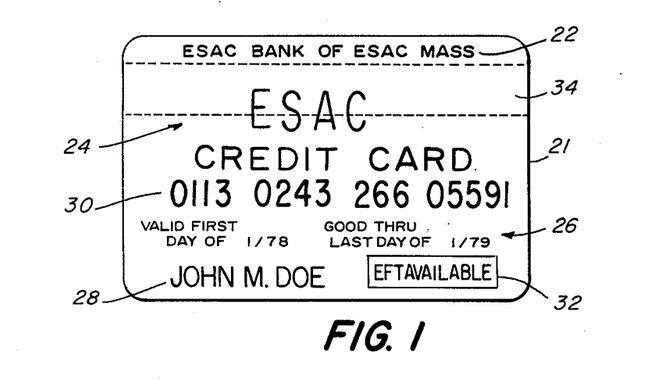
FIG. 1 is a face view of a credit card adapted for use in the present invention.

In FIG. 1, 21 is a credit card of the usual plastic card material. It is imprinted on its face with an identification 22 of the name and location of the issuer, an identification 24 of the nature of the card, the period of validity 26 of the card and the name of the card holder at 28. Across the face of the card is embossed, at 30, the condensed assigned bank ABA routing symbols and the account number of the card holder. The latter number is preferably the same as the checking account number, if any, which has been assigned to the card holder. Thus the series of digits at 30 constitute a universally accepted unambiguous identification of the issuer and card holder. These digits as well as the name of the card holder at 28 and the starting and expiration dates at 26 are embossed in raised characters such that they comprise a die from which these characters can be transferred to the usual sales slip by being pressed onto the slip through a sheet of carbon paper, in a well known fashion. If the issuer is equipped to receive and process data for funds transfer purposes by EFT, the face of the card also bears a notation to that effect at 32. If it is not so equipped such notation is omitted. As indicated in dotted lines, the back of the card 21 is provided with a stripe of magnetic material 34 in which is magnetically encoded the series of numbers appearing at 30 on the face of the card. The credit card 21 may also have other standard types of identification such as the signature of the card holder which may be placed on a strip on the back of the card.

Figure 2:
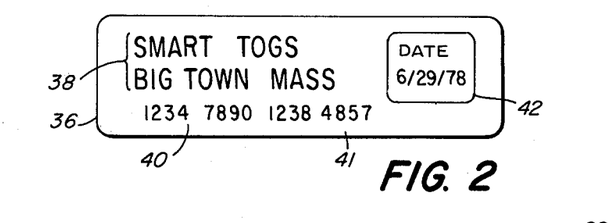
FIG. 2 is a face view of a merchant's die adapted to be used in conjunction with the credit card of FIG. 1.

Each merchant who is authorized to conduct transactions under the credit card is provided with a die card 36 (FIG. 2) of his own bearing his name and address at 38, and also, at 40, the mandatory ABA routing symbol for the bank in which he makes his deposits and, at 41 with the bank assigned ABA digit numbers symbols of his account number in such bank. The characters at 38, 40, and 41 appear as raised figures which can be transferred to the sales slip as described above. The merchant's die is also provided with an embossed date portion at 42 which is inserted into the die at the start of each business day.

The sales slip, onto which are imprinted the embossed characters described above, is shown in FIG. 3. The sales slip is presented as a packet 44 of three copies, of which the top copy may be retained by the merchant, the middle copy by the customer and the back copy to be deposited in the merchant's bank. Sheets of carbon paper are usually places between the several copies so that, when the die cards 21 and 36 are pressed against the packet the embossed characters are imprinted on each copy. The bank copy is preferable of a heavier material so that it can be imprinted with MICR characters along its bottom edge and may be perforated with a punch out as will be explained. To facilitate the MICR printing, the merchant's and the customer's copy are shorter than the bank's copy so as to leave the face of the lower edge 45 of the bank's copy exposed to a MICR printer.

Figures 4, 5, 6:
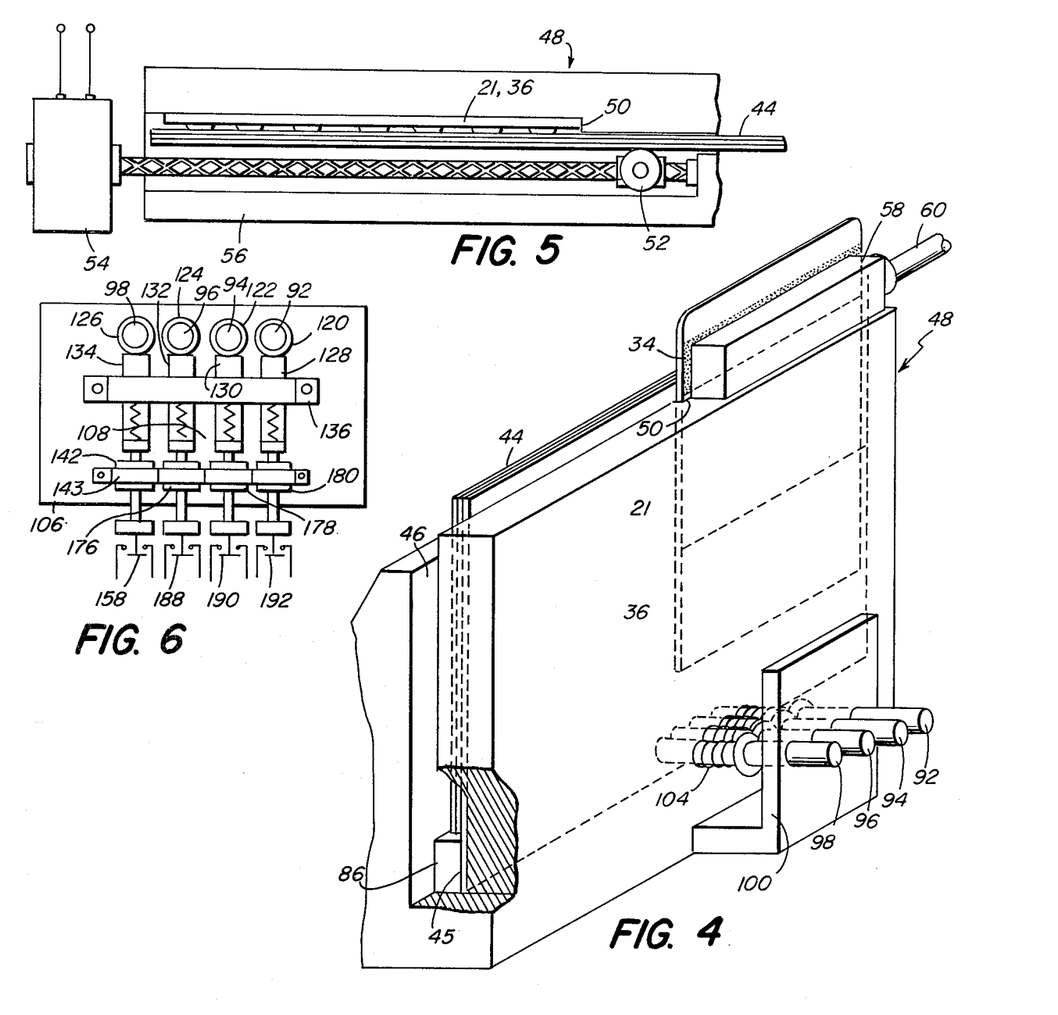
FIG. 4 is a diagrammatic representation of a portion of the novel machine of this invention showing a portion of the punch-out mechanism and the magnetic stripe reader.
FIG. 5 is a diagrammatic view of the mechanism for transferring the die characters of the credit card and the merchant's die to the sales slip packet.
FIG. 6 is a diagrammatic view of a portion of the punch-out selection mechanism of the machine.
Figure 7:
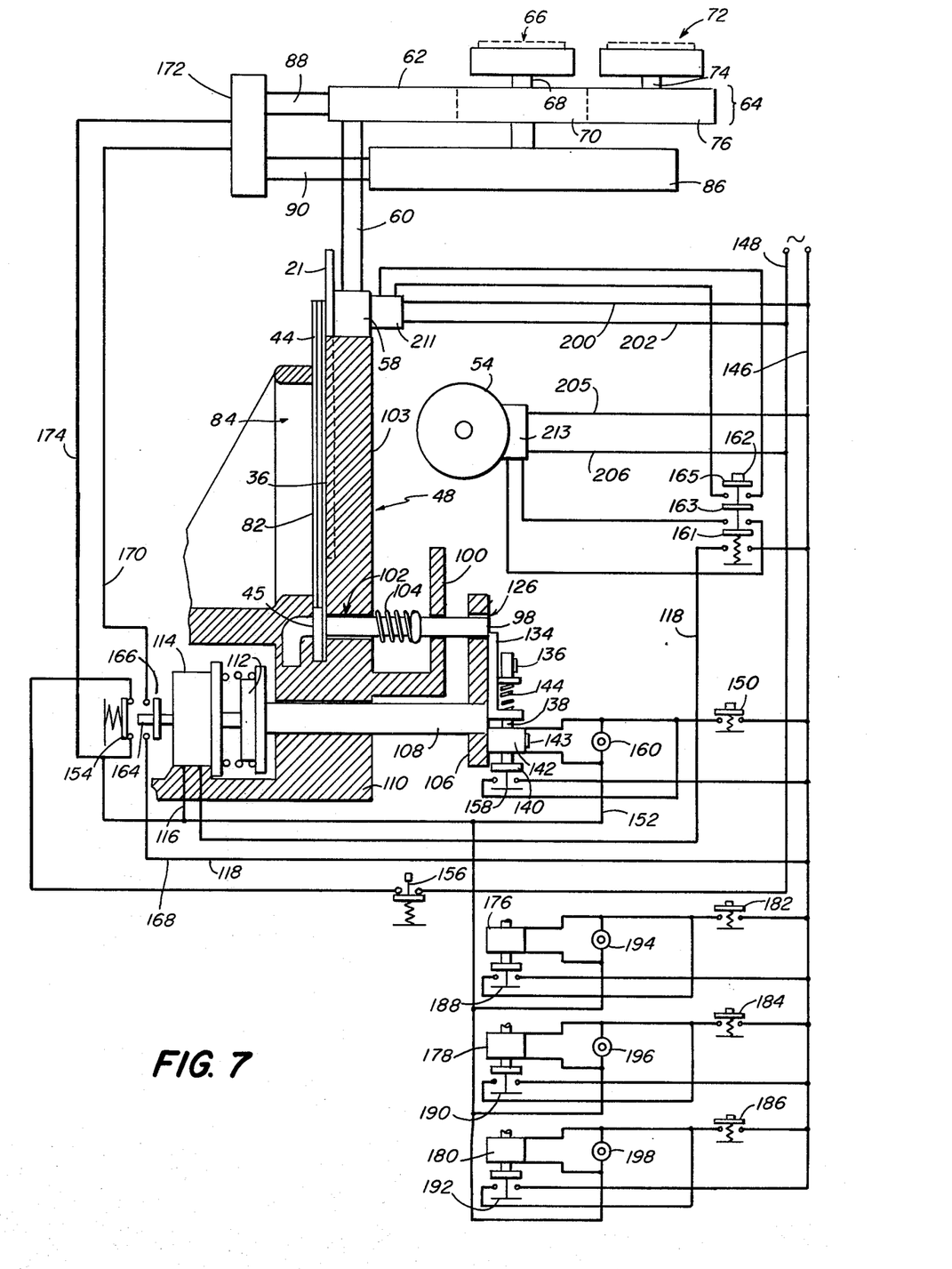
FIG. 7 is an overall diagram of the machine including a circuit diagram interrelating the various parts of the machine.

The sales slip packet 44 is adapted to be inserted into a slot 46 in the machine 48, shown diagrammatically in FIGS. 4 and 7. Machine 48 is also provided with a slot 50 (FIG. 4) into which is inserted the merchant's die card 36 and the credit card 21. The merchant's card 36, with its date portion 42, is inserted into the machine at the beginning of each business day to remain in place as various credit cards 21 are processed in the machine. The embossed characters are transferred to the several sales slip copies by any convenient means, such as a pressure roller 52 (see FIG. 5) which is moved back and forth across the face of the sales slip packet 44 by means of a motor 54 driving a reversing lead screw 56.

As indicated diagrammatically in FIGS. 4 and 7, the machine 48 carries a known type of magnetic stripe reader 58 to which the magnetic stripe 34 of credit card 21 is presented. A transmission line 60 conveys the data read by the stripe reader to a first memory section 62 of a known type of memory storage device 64. The machine is also provided with a date keyboard 66 (FIGS. 7 and 8) from which a transmission line 68 carries the date information into a second memory section 70 of the memory storage 64. The machine is further provided with a keyboard 72 into which the amounts of the transaction involved may be punched. A transmission line 74 carries this information into a third memory section 76 of the memory storage 64.

The machine 48 (FIG. 8) is also provided with conventional types of registers 78 and 80 in which the figures punched into the keyboards 66 and 72 appear visually.

The sales slip 44 is preferably provided with a transaction description section 82 in which the merchant may enter his description of the transaction together with the total amount of the transaction. The machine 48 is also provided with a window 84 in which section 82 is displayed when the sales slip packet 44 is inserted into the machine.

The machine 48 is also provided with any known type of MICR printer 86 (FIG. 4) located adjacent the exposed lower face 45 of the bank's copy of the sales slip. As will be explained, when energizing inpulses are supplied to the memory storage device 64 and the printer 86 through transmission lines 88 and 90 respectively, (FIG. 7) device 64 will deliver its data to printer 86 which will print such data in MICR characters along said lower face 45.

The machine is also provided with a mechanism for placing a punch out in any one of four uniquely located positions along said face 45 to identify a number of singular aspects of the transaction. Such a punch out will designate whether the transaction is a charge or a credit and whether it is to be processed through EFT or EDP channels. For this purpose the machine is provided with four punches 92, 94, 96 and 98, (FIGS. 4 and 6), slidably mounted in a bracket 100 and projecting through passages 102 (FIG. 7) in the wall 103 of the machine against which the sales packet 44 rests. Each punch is biased out of punching engagement with the lower edge of the bank copy of the sales slip by means of a spring 104.

The means for operating the punches 92-98 comprises a movable plate 106 (FIGS. 6 and 7) fastened to the outer end of a rod 108 slidably mounted in the frame 110 of the machine 48. A magnetic armature 112 is secured to the inner end of rod 108 and moves the rod 108 carrying the plate 106 to the left in FIG. 7 when attracted by an electromagnet 114 energized from a pair of conductors 116 and 118. The outer ends of the punches 92-98 pass freely through openings 120, 122, 124, 126 in plate 106. Therefore, in order that such movement of plate 106 will actuate a selected one of the punches 92-98, plate 106 carries four slidable plates 128, 130, 132, 134 slidably retained on plate 106 by a retaining bracket 136. As exemplified by plate 134 as shown in FIG. 7, each slidable plate is carried by a thrust rod 138, actuated by an armature 140 of an electromagnet 142. The electromagnet 142 is secured to plate 106 by a strap 143, shown more clearly in FIG. 6. The plate 134 is biased to its lower position by means of a brasing spring 144, and in such lower position the upper end of the plate 134 is out of line with the end of its associated punch 98. However, when electromagnet 142 is energized, it attracts armature 140 which slides plate 134, attached to thrust rod 138, upward across the end of its associated punch 98. Now, when plate 106 is moved by rod 108, plate 134 engages the end of punch 98 and moves it into punching engagement with the lower edge of the bank copy of the sales slip packet. Thus the desired punch out is produced in its preselected position determined by the position of punch 98.

FIG. 7 contains a circuit diagram of one arrangement for the control of the punch selection as well as circuit diagram details of the rest of the machine system. The circuits are energized from a pair of power line conductors 146 and 148. An energizing circuit for electromagnet 142 extends from conductor 146 through a push button switch 150, electromagnet 142, conductor 152, switch 154, switch 156, to conductor 148. Switches 154 and 156 are normally spring biased in a closed position. Thus, when switch 150 is closed, electromagnet 142 is energized to raise plate 134 into operating relationship with its punch 98. Since the closure of switch 150 may be momentary, a holding circuit is established across switch 150 by means of a switch element 158 carried by armature 140. A lamp 160 is connected directly across electromagnet 142 to indicate that it is energized. The arrangement for selecting and energizing each of the other punches will be explained in detail below.

The circuit for operating electromagnet 114 extends from conductor 146 through contact arm 161 of push button switch 162, conductor 118, through electromagnet 114, conductor 116, normally closed switches 154 and 156, to conductor 148. Thus when switch 162 is closed, electromagnet 114 produces the punch out operation of punch 98, as described above.

The armature 112 of electromagnet 114 also carries a switch operating member 164, carrying a switch arm 166 which closes a pair of switch contacts completing a circuit between conductors, 168 and 170. This establishes an energizing circuit for a pulse generating device 172 extending from conductor 146, conductor 168, switch 166, conductor 170, pulse generator 172, and conductor 174 which is connected to conductor 152. Thus the remaining portion of the energizing circuit for pulse generator 172 is completed through normally closed switches 154 and 156 to conductor 146.

Push button switch 162 carries two additional contact arms 163 and 165 for controlling the energization of motor 54 and stripe reader 58, as will be explained below.

When electromagnet 114 has completed its function of producing the selected punch out and has supplied an energizing impulse to pulse generator 172, switch operator 164 engages switch 154 causing it to open. It will be noted that switch 154 is interposed in the holding circuits for elements 142, 114 and 172 and therefore, when these elements have completed their operating functions, they are deenergized and return to their initial states. In its initial state, slide plate 134 is withdrawn from its engagement with punch 98, leaving the system free to allow the selection of any of the punches for each succeeding operation.

As shown in FIG. 6, in addition to the electromagnet 142, the strap 143 also secures electromagnets 176, 178, and 180 to the plate 106. As described for electromagnet 142, these additional electromagnets, when energized, slide plates 132, 130, and 128 into engagement with the ends of punches 96, 94, and 92 respectively. The circuit diagram for the selective energization of these additional electromagnets is shown in FIG. 7. Push button switches 182, 184, and 186 are connected between line 146 and electromagnets 176, 178 and 180 respectively exactly the same as in the case of switch 150 and electromagnet 143. Holding switches 188, 190, and 192 perform the same function for electromagnets 176, 178, and 180 as does holding switch 158 for electromagnet 142. Likewise indicator lamps 194, 196, and 198 are connected across electromagnets 176, 178, and 180 respectively, as indicator lamp 160 is connected across electromagnet 142. Therefore punch 96 is selected by pushing switch 182, punch 94 is selected by pushing switch 184, and punch 92 is selected by pushing switch 186.

The circuit for energizing the stripe reader 58 to cause it to read the data encoded magnetically on stripe 34 and to store such data in the memory section 62 comprises a pair of lines 200 and 202 extending from lines 146 and 148 through a control device 211 to stripe reader 58. The contact arm 165 of push button switch 162 closes a circuit across control device 211 which sets stripe reader 58 in operation.

The circuit for energizing motor 54 to transfer the embossed letter of the card 21 and die 36 to the sales slip packet, comprises a pair of lines 205 and 206 extending from lines 146 and 148 through a control device 213 to motor 54. The contact arm 163 of push button switch 162 closes a circuit across control device 213 which controls the energization of motor 54 until it has driven the roller 52 back and forth across the face of the sales slip.

Figure 8:
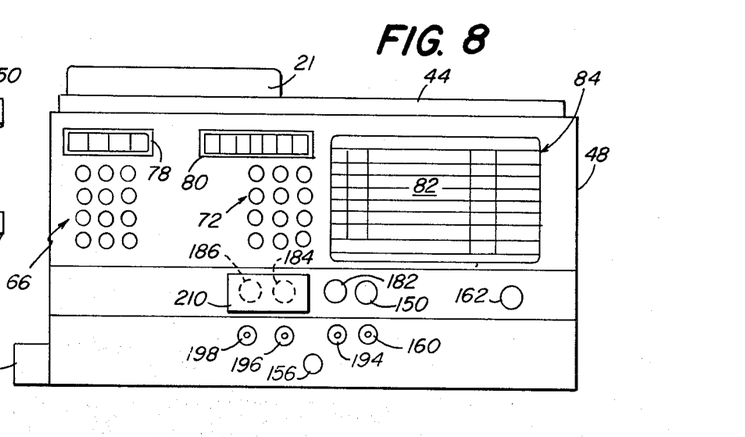
FIG. 8 is a representation of a front view of the machine.

The several push button switches and indicator lamps described above are mounted on the front of machine 48, said switches and lamps being designated by their respective numbers as shown in FIG. 8.

Figure 9:
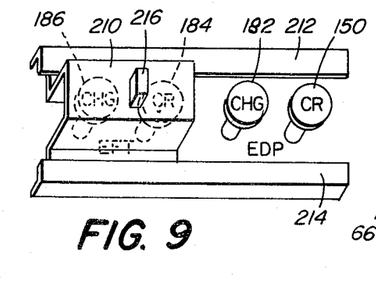
FIG. 9 shows a detail of a portion of the means for selecting either EDP or EFT punch-outs to be made in the sales slip.

The four push button switches 150, 182, 184, 186 are shown in the enlarged diagram of FIG. 9. Push buttons 182 and 150 are operated when the credit card involved in the transaction is to be processed by EDP and push button 186 and 184 are operated when the credit card is to be processed by EFT. In each case, push button 182 and 186 are operated if the transaction is one in which the customer is to be charged for his purchase and the push buttons 150 and 184 are operated when the customer is being given credit for goods returned. Machine 48 is provided with a sliding shield 210, slidably mounted by means of a pair of slides 212, 214. When moved to its left hand position, shield 210 covers push buttons 184 and 186 so that only push buttons 182 and 150 are accessible for operation. When shield 210 is moved to its right hand position, it covers push buttons 182 and 150 so that only push buttons 186 and 184 are accessible for operation. A handle 216 may be provided to move shield 120 to its selected position. Shield 210 is set in its left hand position when the transaction is to be processed by EDP and in its right hand position when EFT processing is to be used.

EFT can be used only when both the issuer bank and the merchant's bank are equipped to process transactions by EFT. Otherwise, EDP must be used. Therefore, before the merchant has made initial use of the machine, he will have ascertained from his bank of deposit of the credit card sales slip, whether the bank is equipped to handle EFT transactions. If not so equipped, shield 210 is placed in its left hand position and remains permanently in that position until or unless the merchant's bank becomes equipped for EFT operation. Normally, the credit cards processed in machine 48 will have been issued by a bank, or other institution equipped for EFT, and the cards will each be plainly marked at 32 (FIG. 1) to that effect. Therefore, if the merchant's bank is equipped for EFT operation, shield 210 will be placed in its right hand position and left there. When the merchant finds it necessary to process credit cards issued by an institution which is not equipped for EFT, whenever such a card is placed in the machine, slide 120 must be shifted to its left hand position. To avoid confusion, machine 48 will be clearly marked adjacent the two pairs of push buttons with an "EDP" or an "EFT" designation so that whichever designation is uncovered by slide 210 will show clearly which type of processing is to be involved.

Also at the beginning of each sales day, the merchant's die card 36 bearing its proper date at 42 will be inserted into slot 50 and left there for the day. The merchant will also type the day of the month of the transaction into the date keyboard 66 which will appear in register 78. At the same time the same information will be stored in memory section 70. Since only the day of the month is used, it will appear as a one or two digit number in its register 78. Since all transactions on a given day will have the same two digit date identification, the two digits will be typed onto the date keyboard only once at the beginning of each business day. Memory section 70 is of the type in which the information stored in it may be read out repeatedly without deleting such stored information. Thus the memory section 70 retains such two digits until changed by having a new date typed onto the date register at the beginning of the next business day.

In operating the system thus far described, the merchant, at the point of sale, after making his required screening of the credit card presented by a customer, will enter a description of the transaction and the amount of money involved on section 82 of a sales slip (see FIG. 1) and request the customer to sign the slip. The merchant will then insert the credit card 21 into slot 50 above the die card 36. If the transaction is a charge, he will push the exposed push button 186 or 182 and if it is a credit, he will push the exposed button 184 or 150. At this point, one of the lamps 198, 196, 194, or 160 adjacent the push button selected will light. Should the merchant have inadvertently pushed the wrong button or have pushed both exposed buttons, he will be able to clear the machine by pushing button 156 and start anew. It will be recalled that push button switch 156 is interposed in the holding circuit for each of the solenoids 143, 176 . . . 180 and by opening the switch any solenoid which has been energized will be deenergized.

The merchant then types the amount of the transaction into the amount keyboard 72, which amount will appear in register 80. At the same time such amount will be stored in memory section 76.

The merchant then merely depresses push button 162 which initiates the sequence of operations including; making the proper punch out; energizing motor 54 to imprint the embossed characters of credit card 21 and die card 36 onto the sales slip packet; energizing stripe reader 58 to transfer the data of stripe 34 into memory section 62; and energyzing pulse generator 172 to cause memory storage 64 to deliver its data to printer 86 for being imprinted on the sales slip face 45, all as fully described above.

Figure 3:
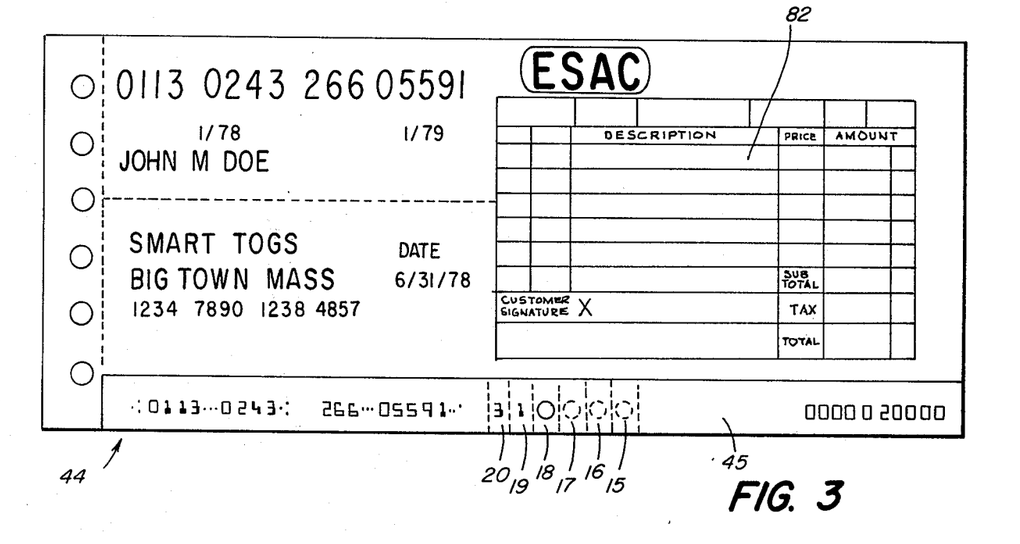
FIG. 3 is a face view of a typical sales slip packet as imprinted in accordance with this invention.

The spaces allocated to the MICR characters, along the face 45 in FIG. 3, are in conformity with the American Bankers Association's (ABA) established space allocation standards. Starting at the left end of the strip in face 45, a block of eleven spaces contain the ABA condensed mandatory routing symbol for the issuer as it has been encoded on stripe 34. The next ten spaces illustrated in FIG. 3 contain the individual bank assigned number symbols for the account number of the credit card holder at the issuer bank, also as encoded on stripe 34.

The next two spaces illustrated, (20, 19) which under the ABA space allocation standards are available for optional use, contain the day of the month which, at the beginning of the business day, had been typed on the date keyboard by the merchant. Under the present practice only a few days, at most, will have passed before each sale slip is finally processed at the issuer bank so that there is very little chance that any ambiguity will arise as to which month of the year is involved. Should any dispute arise as to the correct month, the original sales slip with the date of the merchant's die printed thereon will be available to resolve the question.

The next four spaces (18, 17, 16, 15) which, under the ABA space allocation standards, are also available for optional use, are here reserved for the location of the selected punch outs. Thus spaces 18, 17, 16 and 15 will be punched by punches 92, 94, 96, and 98 respectively. As a result the bank copy of each sales slip will be unambiguously labelled as involving a charge or a credit and as being one to be processed by EDP or EFT. The six spaces here reserved for the date and the punch outs will be referred to hereafter as "ABA standards optional spaces".

The right hand end of the strip on face 45 comprises a block of ten spaces, mandatory, under the above standards, for the dollar amount of the transaction. Such sum is typed by the merchant on amount keyboard 72 and thus appears at the right hand end of face 45 in MICR characters.

As initially indicated, the system of the present invention is such that a variety of instrumentalities may be adapted to be processed in the present system and can be coordinated to work in conjunction with the system of copending application Ser. No. 924,200. The instrumentalities which can thus be handled are, the travel cards of U.S. Pat. No. 4,017,101, which can be designated to be processed either by EFT or EDP, charges and credits under credit cards, to be processed either by EFT or EDP as described above, and checks and other items to be processed by the usual EDP procedures.

It should be noted that, although the embodiment of the machine described above incorporates four punches to locate punch outs in a series of four ABA standards optional spaces, the total number of such spaces are six, two of which are reserved for designating the day of the month for credit card transactions. In the case of travel cards these latter two spaces can be used to designate a travel card to be processed by EDP or a travel card to be processed by EFT. The absence of any punch out may be used to distinguish checks and other items from the punch out designated items described above. Therefor a total of seven different funds transfer items may be distinguished and processed in a combined system incorporating the present invention. Such a combined system is detailed in the diagram of FIG. 10.

Figure 10:
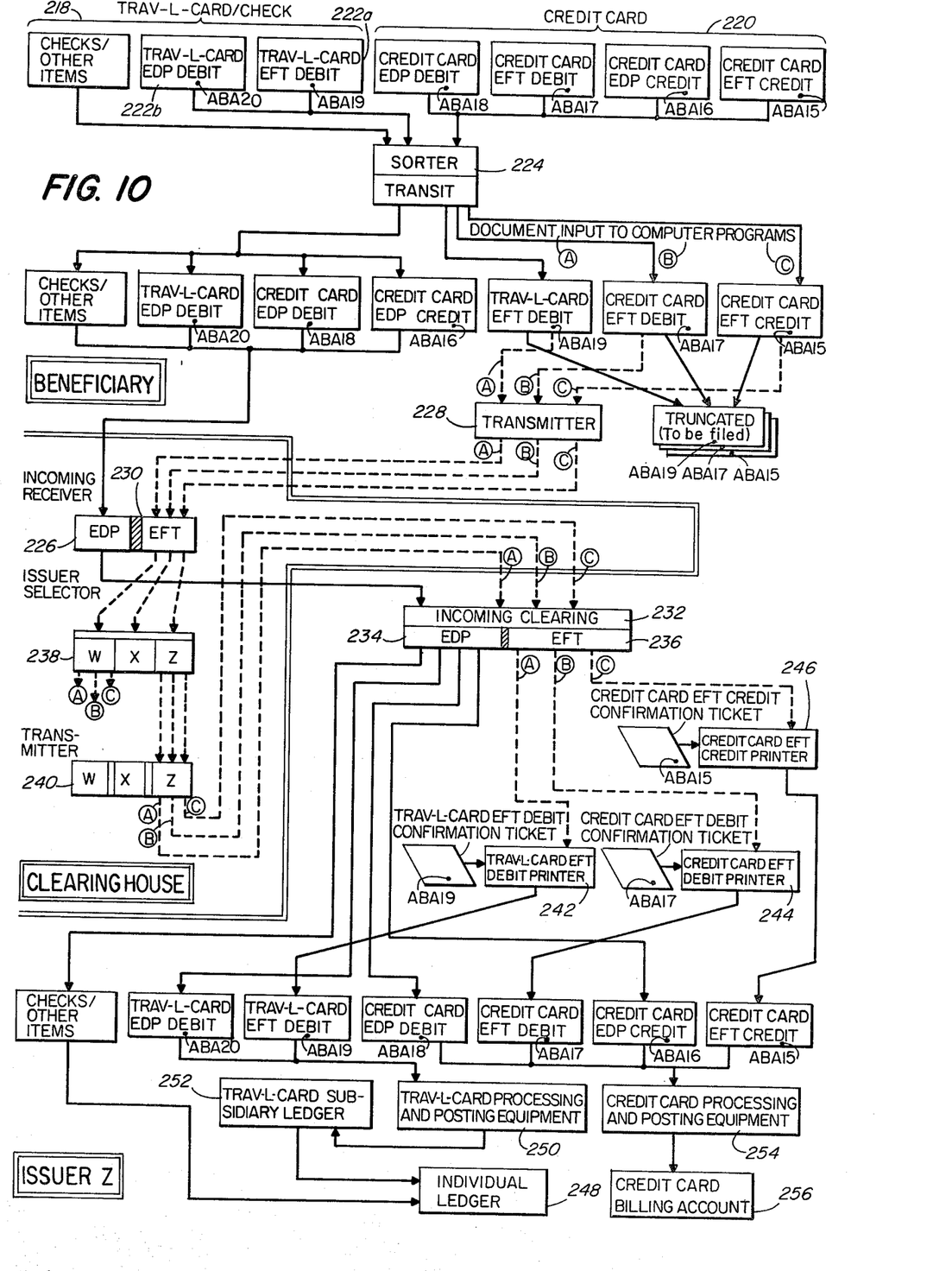
FIG. 10 is a diagram of an overall system incorporating the present invention as adapted to process a wide variety of funds transfer transactions.

In FIG. 10, the bracket 218 designates the group of items comprising travel cards, checks and other items, while the bracket 220, designates the credit card items as described above. The designations "ABA 15"–"ABA 20" indicate the different punch out locations on the several items illustrated. These are the numbers assigned in the ABA established allocation standards to the locations designated and are the same reference numbers used in FIG. 3 of this specification. As is described in the referenced copending application, a funds transfer ticket 222a or 222b in FIG. 10 hereof is used when a travel card is involved. Such a ticket is also imprinted with MICR characters and is provided with a punch out. In such ticket two of the optional spaces are used for the draw number of the transaction being processed by the travel card and two optional spaces are used for the expiration date of the travel card. When such travel cards are to be processed on the same system with credit cards, a punch out in space 19 on ticket 222a can be used to designate that the travel card transaction is to be processed by EFT and a punch out in space 20 on ticket 222b can be used to designate that the travel card transaction is to be processed by EDP. The remaining four optional spaces are used for the draw number and expiration date as pointed out above. The selection of the position of the punch out is made by the representative of the beneficiary at the time of the transaction on substantially the same basis as that used to select EDP or EFT credit cards. If both the beneficiary and the issuer are equipped for EFT, position 19 is selected, if not, then position 20 is selected. It will be noted that the term "debit" in FIG. 10 is used in the same sense as the term "charge" in the case of the credit card system described above.

Since each item with a punch out is uniquely designated by its ABA position number, such ABA position number is used to control the handling pattern of the item throughout the transmission network of FIG. 10. The seven items ABA 15 through ABA 20 and the "checks and other items" are deposited in unsorted condition in the bank of deposit of the merchant or beneficiary and delivered to a sorter 224. Such a sorter is adapted to separate the documents into seven different segregated groups depending upon the presence and position of the punch out, or its lack thereof.

In FIG. 10, the dotted lines, terminating in arrows, designate the transmission of the information contained in the document by means of tested wire communication or the like. Also the double line separations and boxes designate the positions of the office of the beneficiary at the top, the office of the clearing house in the center, and the office of the issuer at the bottom.

All the items to be processed by EDP are segregated by the sorter 224 into a separate category of items (shown at the left hand side of FIG. 10). These items comprise the ABA 16, ABA 18, and ABA 20 items together with the checks and other items having no punch out. These EDP items are then physically transmitted to an EDP receiving section 226 at the clearing house.

The other items ABA 15, ABA 17, and ABA 19 to be processed by EFT are fed into separate computer program elements A, B, and C each of which will read the data recorded in MICR characters on the item, translate such data into message form and deliver such message to corresponding sections A, B, and C of a transmitter 228 which will transmit the corresponding messages A, B, and C to an EFT receiver section 230 in the office of clearing house. It will be noted that message A relates to travel card charges, message B relates to credit card charges and message C to credit cards credits. Back at the beneficiary's office, the physical documents ABA 15, ABA 17, and ABA 19, are truncated and set aside for filing in case they may be needed at some future time for confirmation purposes.

The EDP items coming into the EDP receiver 226 are separated at the clearing house by its standard procedures into groups which are to be sent to the individual issuers, on whom they are drawn, and then physically transported to such issuers. One of such issuers is designated in FIG. 10 as "Issuer Z". Each issuer has an incoming clearing department 232 with an EDP section 234 and an EFT section 236.

The EFT messages A, B, and C received at the clearing house EFT receiver 230, are fed into an issuer selector 238 which is programmed to separate the messages into those which are directed to each particular issuer designated in the message. Those directed to issuer Z will be routed into section Z of a message transmitter 240 which will transmit the A, B, and C messages to the EFT receiving section 236 at issuer Z. Each issuer equipped for EFT, will be provided with three special ticket printers 242, 244, and 246 to which messages A, B, and C respectively are transmitted. Each printer will be supplied with its own supply of blank tickets each prepunched with a punch out in the proper location so that it is not necessary for the printer itself to make the punch out. Printer 242 will print a duplicate of the ABA 19 items described in the A messages, printer 244 will print duplicates of the ABA 17 items described in the B messages, and printer 246 will print duplicates of the ABA 15 items described in the C messages. Such duplicates will each contain a punch out in its proper location. The data appearing in MICR characters across the bottom of each of the original items described in such messages will also be duplicated by the issuers' printers in MICR character across the bottom of the corresponding items produced by the printers.

The outputs of the EDP receiver 234 and the printers 242, 244, and 246 are shown in FIG. 10 as being lined up in the third horizontal row of items from the bottom. It will be noted that such row is an exact duplicate of the row of items under the brackets 218 and 220 at the top of FIG. 10. The checks and other items will be entered into the individual depositors ledger 248 accordance with the banks usual procedures for such items. At this stage the EFT capabilities of the bank have already been used so that the EDP and EFT items can now be treated the same. Therefore, the travel card items ABA 19 and ABA 20 are gathered together and fed into the travel card processing and posting equipment 250 from which they flow through the travel card subsidiary ledger 252 for posting, and thereafter as a charge to the individual ledger 248.

The credit card transactions are ones in which the credit card holder must be billed for the charges incurred, and credited for any credits due. Therefore, all of the credit card items ABA 15, ABA 16, ABA 17, and ABA 18 are gathered together and fed into a credit card processing and posting equipment 254. The presence of the uniquely located punchouts 15, 16, 17, and 18 in these items and the MICR characters printed on these items enables the equipment to properly allocate and enter into the proper card holder's billing account 256 everything necessary to prepare and present a complete and accurate bill to the card holder.

The system as described above, including machine 48, is compatable with the use of credit cards by merchants who do not have such a machine. In such case, the merchant will use his older type of sales slip imprinter and enter data in accordance with his previous practice. However, when such a sales slip is deposited in his bank, that bank will use its machines to imprint and punch out its copy as described and shown in FIG. 3. Thereafter the system will work as described above.

It is to be understood that the preferred embodiment, as detailed above, constitutes but one embodiment of the invention and that other variations may suggest themselves to those skilled in the art. For example, the functions of those devices illustrated as mechanical relays might be carried out by solid state devices. Instead of four or six punch outs, a basic number might suffice for some purposes. Likewise the presence of more than a single punch out might be used to designate other types of transactions where all of the remaining optional ABA spaces are not required to supply informational data. Should other forms of machine readable characters, other than MICR characters, become commonly accepted for use in funds transfer systems, such machine readable characters might be substituted in the system of the present invention.

Various other modifications, within the scope of the appended claims, will suggest themselves to those skilled in the art.

What is claimed is:

1. A credit card processing system comprising:
   (a) a credit card of the type carrying a magnetic stipe into which is encoded an identification of the issuer institution and the account number of the card holder;
   (b) a merchant's sales slip bank copy having imprinted thereon an identification of said merchant and the date of the transaction represented by said sales slip;
   (c) a machine adapted to receive said credit card and said bank copy;
   (d) said machine, comprising a printer for printing MICR characters onto an edge of said bank copy; a magnetic stripe reader; a date keyboard section; a monetary amount keyboard section; and a plurality of movable punch members each located in one of the optional ABA standards positions with respect to said edge of said bank copy; each of said positions being preselected to define the nature of the transaction recorded on said bank copy;
   (e) means for selecting any one of said punch members to be moved into a punch out operation on said bank copy and for moving the punch member so selected into such operation to produce a punch-out at one of said preselected positions on said edge;
   (f) said magnetic stripe reader being adapted to read the information encoded in said magnetic stripe and supplying said information to said printer;
   (g) said printer being adapted to print, in MICR characters along said edge, the information supplied to it by said magnetic stripe reader;
   (h) said date keyboard section being adapted to transmit to said printer the date information inserted into said keyboard section; and said printer also being adapted to print said information in other of said optional ABA standards positions adjacent the positions reserved for such punches; and
   (i) said amount keyboard section being adapted to transmit to said printer the amount inserted into said amount keyboard section and said printer also being adapted to print such amount onto said edge.

2. A system as in claim 1 in which:
   (a) a punch out at a first of said preselected positions on one of said sales slip copies constitutes an indication that said copy is to be processed by EDP procedures, and a punch-out located at a second of said preselected positions on another of said sales slip copies constitutes an indication that said copy is to be processed by EFT procedures, said system also comprising;
   (b) sorting means at the sales slip depository for sorting said sales slips and for other funds transference documents; said sorting means being adapted, in response to said punch outs, to segregate all documents having a punch-out at said first position from all documents having a punch-out at said second position;
   (c) a first communication channel for physically transferring all segregated documents having a punch-out in said first position through clearance means to the issuer of said credit card;
   (d) a second communication channel including means for transmitting messages containing the punch-out and MICR character information of each of the segregated documents, having a punch out in said second position, through clearance channels to the issuer of said credit cards; and
   (e) means at said issuer for reproducing, from said received information, a substantial duplicate of each document as described in such message transmissions.

3. A system as in claim 2 in which:
   (a) a punch out in said first and second positions also constitutes an indication that the transaction involved in said sales slip is a charge against the holder of said card and in which a punch out at a third of said predetermined positions on another of said sales slips institutes an indication that the transaction is a credit in favor of the card holder and is to be processed by EDP procedures, and in which a punch-out at a fourth of said predetermined positions or another of said sales slips constitutes an indication that the transaction is a credit in favor of the card holder and is to be processed by EFT procedures;
   (b) said sorting means also being adapted in response to said punch outs, to segregate all documents having punch-outs into four separate groups in accordance with the positions of the punch-outs on said sales slips;
   (c) means for delivering all sales slips having a punch-out in said first and third positions into said first communication channel;
   (d) means for delivering all sales slips having a punch-out in said second and fourth positions into said second communication channel;
   (e) each of said communication channels being adapted to process all documents delivered into them in the same manner;
   (f) means at the issuer to separate all the sales slips delivered to it and reproduced by it into two groups, in response to the positions of said punch outs, one of said groups constituting charge items and the other credit items.

4. A system as in claim 1 in which said machine is provided with:
   (a) a common means for driving said punch members to produce punch-outs;
   (b) separately energizable coupling means for coupling each of said punch members to said common means; and
   (c) selection means adapted to be manually operated for selecting which of said coupling means is to be energized, whereby the position of any punch-out may be predetermined.

5. A system as in claim 1, provided with:
   (a) manually operable means for selecting which of said punch members are to be energized;
   (b) shielding means for selectively shielding some of said manually operable means against manual access and exposing others of said means to such access, and;
   (c) means for moving said shielding means into its desired position in accordance with a predetermined desired operation of said system.

* * * * *